United States Patent

Ponziani et al.

Patent Number: 6,012,197
Date of Patent: Jan. 11, 2000

[54] WINDSHIELD WIPER STRUCTURE WITH FREEZE RESISTANCE JOINTS

[75] Inventors: Richard L. Ponziani, Centerville, Ohio; Echardt W. Schmid, Auburn Hills, Mich.; Daniel J. Bocklage, Beavercreek; Chad R. Putnam, Xenia, both of S.C.; Dennis P. Thorton, Rochester, Mich.

[73] Assignee: ITT Manufacturing Enterprises, Inc., Wilmington, Del.

[21] Appl. No.: 09/065,874

[22] Filed: Apr. 24, 1998

[51] Int. Cl.[7] .................................................. B60S 1/38
[52] U.S. Cl. ...................... 15/250.46; 15/250.44
[58] Field of Search .................... 15/250.46, 250.44, 15/250.48, 250.201, 250.43, 250.451, 250.452, 250.453, 250.454

[56] References Cited

U.S. PATENT DOCUMENTS

| | | | |
|---|---|---|---|
| 3,644,957 | 2/1972 | Deibel et al. | 15/250.46 |
| 3,673,631 | 7/1972 | Yamadai et al. | 15/250.44 |
| 4,309,790 | 1/1982 | Bauer et al. | 15/250.44 |
| 4,741,071 | 5/1988 | Bauer et al. | 15/250.44 |
| 4,766,636 | 8/1988 | Shinpo | 15/250.201 |
| 5,023,972 | 6/1991 | Bauer et al. | 15/250.361 |
| 5,048,145 | 9/1991 | Takahashi et al. | 15/250.46 |
| 5,172,449 | 12/1992 | Baumgarten et al. | 15/250.44 |
| 5,179,761 | 1/1993 | Buechele et al. | 15/250.201 |
| 5,231,730 | 8/1993 | Schmid et al. | 15/250.452 |
| 5,271,122 | 12/1993 | Roth et al. | 15/250.46 |
| 5,339,510 | 8/1994 | Roth et al. | 15/250.46 |
| 5,666,687 | 9/1997 | Charng | 15/250.46 |
| 5,742,973 | 4/1998 | Kessler | 15/250.44 |
| 5,819,361 | 10/1998 | Merkel et al. | 15/250.46 |

FOREIGN PATENT DOCUMENTS

| | | | |
|---|---|---|---|
| 3004478 | 8/1981 | Germany . | |
| 3007351 | 9/1981 | Germany | 15/250.44 |

*Primary Examiner*—Gary K. Graham
*Attorney, Agent, or Firm*—J. Gordon Lewis

[57] ABSTRACT

A wiper blade assembly for a windshield wiper system of a motor vehicle is described in which a carrier yoke system which interconnects the wiper arm with the blade element is constructed of cascadingly interconnected yokes or bows. Pivot joints interconnecting the various yokes includes an opening formed in one or both of opposed yoke surfaces near the joint to expel solid foreign objects such as ice lodged there between.

10 Claims, 2 Drawing Sheets

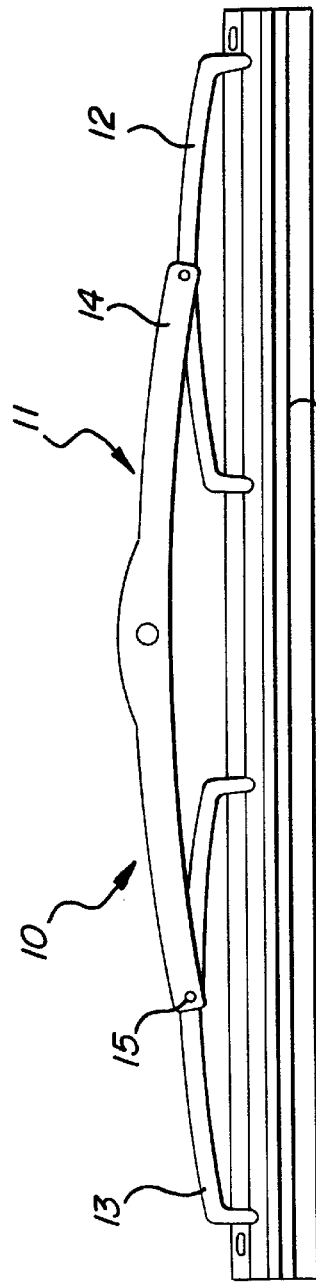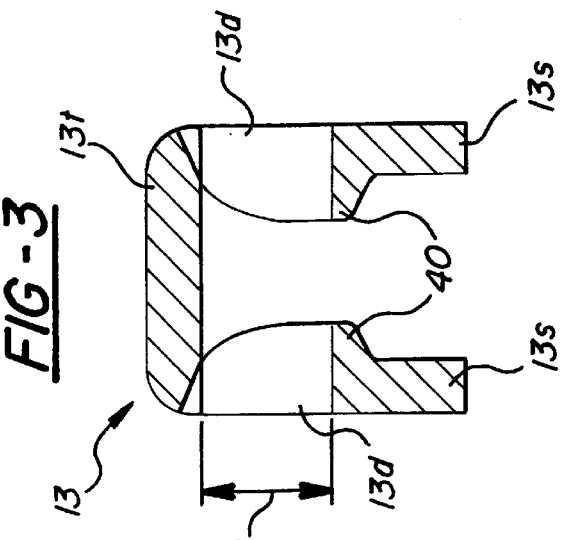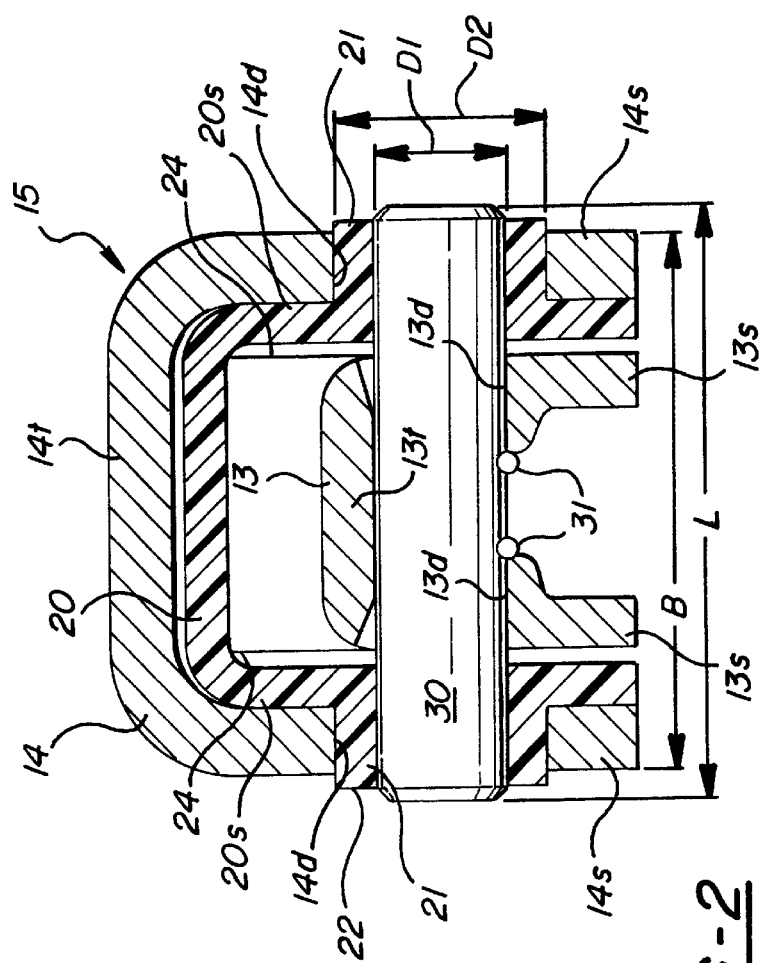

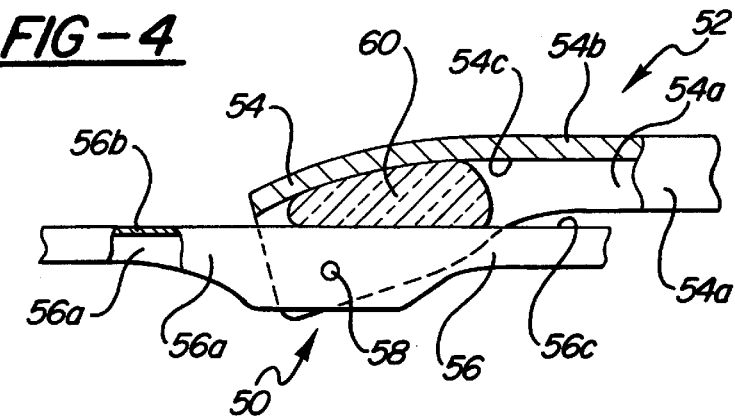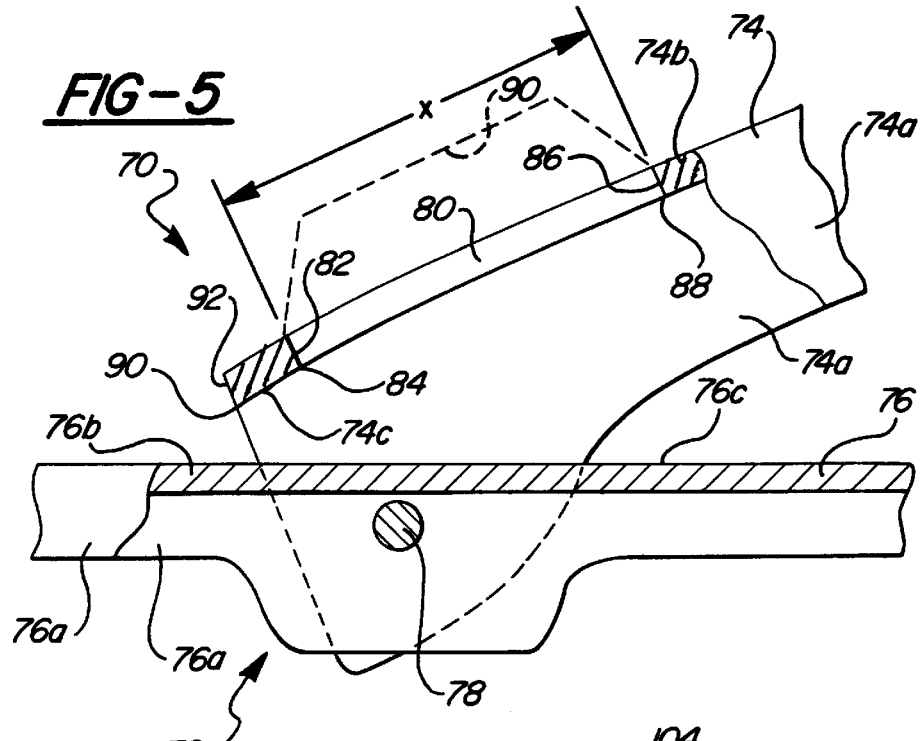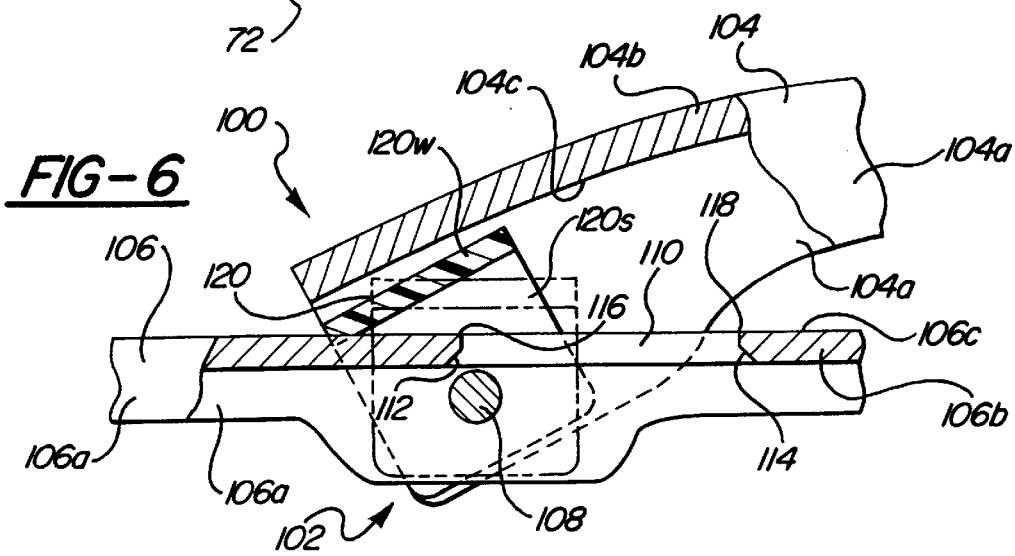

WINDSHIELD WIPER STRUCTURE WITH FREEZE RESISTANCE JOINTS

The present invention relates to windshield wiper blade assemblies, especially for windshield wiper systems for motor vehicles. More particularly, the present invention relates to windshield wiper structures which operatively interconnect the wiping blade element to the driven wiper arm.

BACKGROUND OF THE INVENTION

Modern motor vehicles usually employ contoured or wrapped windshields. Windshield wiper systems, in order to effectively clean the outer surface of such windshields, typically comprise a carrier yoke system consisting of several parts for guiding a rubber wiper element. The carrier yoke system mostly includes a primary yoke onto which two secondary yokes, namely clawed yokes are swivellably mounted. In wiper blades having a short lateral length, the secondary yoke is mounted to the primary yoke via a plastic link with pivot pins laterally sticking out. In wiper blades of larger lateral length, the secondary yoke is mounted to the primary yoke via a metallic rivet pin. Concerning both solutions, there are advantages and disadvantages. When using a plastic link, the mostly metallic yokes are prevented from touching each other and thus disturbing noises are avoided. However, these embodiments with a plastic link do not always meet the requirement of stability and unadmissably large play cannot be avoided after an extended period of operation.

The stability of the riveted wiper blade is better, but the corrosional behavior does not meet all the requirements, for in these wiper blades the rivet head is formed by a tumbling riveting process so that a press-fit is produced by deforming the rivet shank immediately under the rivet head, and the articulated rivet and the primary yoke are connected with each other in a sufficiently firm way. However, during this tumbling riveting process sometimes the varnish of the yoke is damaged so that this point of corrosion is increased. Thus, however, the rivet connection is also damaged so that, after all, a non-rotatable connection between the articulated rivet and the primary yoke is no longer guaranteed. The consequence thereof is that again the apertures in the side walls of the primary yoke are worn out and thus the play in the articulation becomes so big that the wiping effort is no longer sufficient.

The above described system of interconnected yokes is typical in modern automotive windshield wiper element support structures designed to maintain a uniform pressure along the length of the blade. Such structures typically have multiple joints, in which the structure is designed to articuate, allowing blade conformance to the windshield shape through the entire wipe stroke. It is important to maintain the freedom of articulation in the structure or the windshield will have areas not wiped, thereby restricting the vehicle operator's vision.

Wiper arm assembles employing such articulated joints are particularly problematic when the vehicle is operated in a snowy or sub-freezing environment. Inevitably, frozen precipitation will accumulate in the area of the windshield wiper blade structures. Present technology of blade structure joints allow the precipitation to accumulate between the joints in a way that requires the articuation action to compress the ice in order to work. This solid mass cannot be compressed and therefore the articulation action ceases to exist as long as the solid is present. The windshield wiper performance is therefore greatly diminished until the solid precipitation is somehow removed through melting or clearing through external means.

BRIEF DESCRIPTION OF INVENTION

An object of the present invention is to develop a wiper blade assembly of the sort mentioned at the beginning in such a way that the articulation between the primary yoke and the secondary yoke meets all the requirements even after an extended time of operation and is self clearing by ejecting foreign objects such as frozen precipitation which accumulates within pivot joints of the structure.

According to the present invention, a windshield wiper structure includes first and second elements which are hingedly disposed for at least limited relative rotation. The elements define opposed surfaces which upon such rotation assume a closely spaced positional relationship. An opening is formed in at least one of the surfaces which operates to expel solid foreign objects which are lodged between the surfaces in response to their relative rotation.

This invention creates a structure joint that resists precipitation accumulation and features an opening on the top surface of the structure elements near the joints that simply prevent a trapping of moisture. The only portion of the two structural elements which come in close proximity to each other are in the sides where the two elements slide past each other. In the event that any accumulation occurs, the action required to free the joint does not involve the compressing of a solid mass. It instead, requires a shearing action of two sides of the joint. This requires a force that is therefore able to be overcome by the spring of the wiper arm, thereby maintaining full articulation action in frozen precipitation situations. The entire structure becomes self-cleaning by utilization of joint shearing principles and precipitation accumulation prevention.

In a preferred embodiment of the invention, through passages or openings are provided on all the top portions of the structure near the joint. This could be the structural element that is on top or in the lower element. Both the stamped holes in the structure and the plastic liner, if designed in, could be made aesthetically pleasing, yet maintain their freeze resistance functionality. The openings do not have to extend all the way into the liner. The preference is to have a portion of the structure material interface with the liner for added strength, without compromising the freeze resistant feature.

According to another aspect of the invention, means are provided to fracture foreign objects, such as ice, disposed between surfaces formed on the elements in response to relative rotation therebetween. Preferably, this can be accomplished with a sharp edge of an opening formed in one or both of the elements. This arrangement has the advantage of providing additional functionality of the windshield wiper structure without significantly adding cost or manufacturing complexity.

According to yet another aspect of the invention, guide means is disposed intermediate the first and second elements and operates to permit relative rotation about an axis of rotation while prohibiting relative axial displacement between the elements. The guide means is dimensioned and disposed for at least limited rotation with respect to both of said elements. This arrangement provides a robust retention of the wiper structure elements while allowing free pivotal rotation there between and further enhances the foreign object/ice clearing properties thereof.

These and other features and advantages of this invention will become apparent upon reading the following specification which, along with the drawings, describes and discloses preferred and alternative embodiments of the invention in detail.

BRIEF DESCRIPTION OF THE DRAWINGS

FIG. 1, is a lateral view of a wiper blade assembly;

FIG. 2, is a cross-sectional view of a typical linking point between a primary or carrier yoke and secondary yoke within the windshield wiper structure of FIG. 1;

FIG. 3, is a cross-sectional view of the secondary yoke of FIG. 2;

FIG. 4, is a broken, cross-sectional view of a typical prior windshield wiper structure joint which is impeded with ice;

FIG. 5, is a broken, cross-sectional view of a windshield wiper structure joint incorporating the present invention; and FIG. 6, is a broken, cross-sectional view of a windshield wiper structure joint incorporating an alternative form of the present invention.

DETAILED DESCRIPTION OF THE PREFERRED AND ALTERNATIVE EMBODIMENTS

FIG. 1 illustrates a wiper blade assembly 10 including a windshield wiper structure or carrier yoke system 11 comprising two clawed or secondary yokes 12 and 13 and a main yoke 14. Yokes may be referred to herein as structural elements or members. Secondary yokes 12 and 13 are swivelly mounted onto primary yoke 14 via an articulation point 15. In a known way, the clawed yokes 12 and 13 serve for guiding a rubber wiping element or blade 16.

FIG. 2 is an enlarged view of the linking point 15 between the clawed yoke 13 and the main yoke 14. This representation makes evident that the yokes comprise two side walls 13S and 14S, respectively, each parallelly arranged to each other as well as web 13T and 14T, respectively, interconnecting the side walls. Apertures 13D and 14D are formed in the side walls 13S and 14S of the yokes which have a generally U-shaped cross-section. FIG. 2 shows that the secondary yoke 13 is extended by the primary yoke 14 in such a way that apertures 13D and 14D in the side walls 13S and 14S are coaxially arranged to one another. A guide means such as a spacer 20, preferably made of injection molded thermal plastic also having a U-shape cross-section is inserted between the secondary yoke 13 and the primary yoke 14. This spacer 20 integrally comprises bearing bushings 21 on the side walls 20S which engage into the apertures 14D in the primary yoke 14. The transverse sides 22 of the bearing bushings 21 extend slightly outwardly of the outer sides of the side walls 14S of the primary yoke 14. On the inner side, ribs 24 are formed onto walls 20S of the spacer 20 onto which ribs 24 the side walls 13S of the secondary yoke 13 form a slip-fit relationship.

The two yokes 13 and 14 are connected with each other via a pivot pin generally designated by 30, which pivot pin 30 is inserted through a bushing 21 after the apertures 13D and 14D having been coaxially arranged. It is important for the present invention 10 that this pivot pin 30 is non-rotatibly connected with the secondary yoke 13. For this purpose, the apertures 13D have a diameter D1 in the side walls 13S of the secondary yoke 13, which diameter D1 is slightly smaller than a diameter of the pivot pin 30. Consequently, pivot pin 30 is non-rotatibly connected with the secondary yoke 13 by press-fit. The sides, for securing the position in axial direction projections 31 can be punched out of pivot pin 30. Thus, in the embodiment according to the invention, the pivot pin 30 is non-rotatably connected with the secondary yoke 13 and is protected against moving in the axial direction. The bushings 21 for the pivot pin 30 rotating with the secondary yoke 13 are slip-fit within apertures 14D in the primary yoke 14 as will be described in detail herein below. During a swiveling movement between the secondary yoke and the primary yoke the bearing surfaces in the area of the articulated bushings so that with respect to the embodiment according to FIG. 2 the effective length of the bearing is bigger than with respect to known riveted wiper blades with which the relative movement is carried out between the secondary yoke and the articulated rivet.

FIG. 2 makes clear that the pivot pin 30 is of continually the same cross-section. Of course, in such an embodiment the diameter D2 in the side walls of the primary yoke has to be bigger than the diameter of the apertures in the side walls of the secondary yokes so that sufficient space is provided for receiving the bearing bushing 21. FIG. 2 illustrates that the length L of the pivot pin is slightly bigger than the Width B of the primary yoke. Thus, the pivot pin slightly exceeds outwardly of the side walls 14S of the primary yoke 14. This avoids the side walls 14S being damaged by the tool when deforming the pivot pin 30 into the apertures of the secondary yoke. For the same reason the bearing bushings 21 are slightly extended outwardly of side walls 14S.

Referring to FIG. 3, secondary yoke 13 has a collar 40 formed in side walls 13S thereof adjacent the edge of apertures 13D so that the surface of the press-fit for the pivot pin 30 is increased. Thereby this pivot pin 30 immediately lies on the lower surface of the web 13T as illustrated in FIG. 2. The result is a construction that takes little space and comprises a non-rotatable connection between the pivot pin 30 and the secondary yoke 13. The pivot pin 30 is generally cylindrical along its axial length and is preferably made of chrome steel because this material seems to combine sufficient stability with good surface smoothness. The spacer 20 is injection molded from plastic with a smooth surface in a known way to form an extremely low friction interface with pivot pin 30 for the articulation without substantial play or looseness. Because this design eliminates a rivet head, the pivot pin 30 does not touch the main yoke, thereby eliminating a common source of corrosion on the exterior of the primary yoke 14. At the point where the secondary yoke and the pivot pin touch each other, corrosion could occur, but there is little tendency of corrosion because this area is protected by the primary yoke. Furthermore, corrosion does not effect the wiping behavior decisively because it occurs at a point where press-fit and no mounting is provided. Of course, the pivot pin and the secondary yoke could be prevented from touching each other metallicaly, for instance by means of plastic coating of the pivot pin 30.

Referring to FIG. 4, the details of a prior art joint, shown generally at 50, are illustrated. A carrier yoke system 52 includes a main yoke 54 pivotally connected to a secondary yoke 56 by a pivot pin 58 extending through registering apertures in side walls 54A and 56A, respectively, of main yoke 54 and secondary yoke 56. Side walls 54A are interconnected by a web 54B and side walls 56A are interconnected by a web 56B.

As illustrated in FIG. 4, with main yoke 54 held in a fixed position, secondary yoke 56 is free for limited rotational displacement about an axis defined by pivot pin 58. Under some operating conditions, particularly when the host wiper system is wet and subjected to freezing temperatures, solid frozen objects such as ice 60 can form in the opening between the upper surface 56C of web 56B of secondary yoke 56 and the lower surface 54C of web 54B of main yoke 54. Under such conditions, when the host wiper system is actuated and the yoke system translates along the surface of the windshield, contours in the glass will act upon secondary yoke 56, attempting to rotationally reposition it with respect to main yoke 54. When such forces attempt to rotate secondary yoke 56 clockwise as illustrated in FIG. 4, the ice 60 will be compressed between surfaces 54C and 56C, thereby preventing the associated wiper blade (not illustrated) from conforming to the contour of the windshield surface. This condition can only be alleviated by physically removing the built up ice 60 or soaking the vehicle in a high ambient atmosphere.

Referring to FIG. 5, the preferred embodiment of the invention is embodied in windshield wiper structure shown generally at 70 including joints 72 pivotally interconnecting one end of a main yoke 74 with a middle portion of a secondary yoke 76. Yokes 74 and 76 are interconnected by a pivot pin 78 which extends through registering apertures in side walls 74A and 76A in main yoke 74 and secondary yoke 76, respectively, substantially as described with respect to FIG. 2 herein above. Side walls 74A and 76A are interconnected by webs 74B and 76B, respectively. Yokes 74 and 76 are constructed to permit limited relative rotation there between about an axis defined by pivot pin 78. As illustrated in FIG. 5, with main yoke 74 being maintained in a relatively fixed position, secondary yoke 76 is nominally free to rotate a limited amount both clockwise and counter-clockwise from its illustrated position. Without considering other systemically imposed limits on rotation, secondary yoke 76 would be free to rotate in either direction until the upper most surface 76C of web 76B of secondary yoke 76 contacted the lower most surface 74C of web 74B of main yoke 74.

In the preferred embodiment of the invention, joint 72 would be replicated at the opposite end of main yoke 74 to construct a carrier yoke system similar to yoke system 11 best seen in FIG. 1. Furthermore, some wiper systems require yoke structures including tertiary yokes pivotally interconnected to one or both ends of the secondary yokes. Such a system is illustrated in German Offenlegungsschrift DE 30 04 478 and U.S. Pat. No. 5,231,730. In its broadest sense the present invention can be employed at each joint between the main yoke and the secondary yokes as well as the secondary yokes and the tertiary yokes. It is to be understood that the joint structures described herein are typical of those that may be used within a complete wiper system.

Web 74B of main yoke 74 has an opening therein in the form of a through passage 80 which extends laterally along the line of elongation of main yoke 74 a dimension designated X beginning at a location generally adjacent pivot pin 78 and extending toward the center of the main yoke 74. Preferably, X exceeds B (see FIG. 2). The end 82 of through passage 80 nearest pivot pin 78 forms a sharp edge 84 where through passage 80 opens onto surface 74C. Likewise, the opposite end 86 of through passage 80 forms a sharp edge 88 where through passage 80 opens into surface 74C.

FIG. 5 illustrates the positional relationship between main yoke 74 and secondary yoke 76 typically assumed when the windshield wiper structure 70 is in its parked condition. As in the case of the description relating to FIG. 4, when structure 70 is wetted and subsequently subjected to freezing temperatures or alternatively a solid foreign object such as an ice fragment becomes lodged in the joint 72 between surfaces 74C and 76C, the foreign object will tend to limit relative rotation between main yoke 74 and secondary yoke 76. When the host vehicle windshield wiper is actuated and the wiper structure 70 is displaced along the surface of the vehicle windshield, secondary yoke 76 will tend to rotate with respect to main yoke 74. If for example, secondary yoke 76 is rotated clockwise about pivot pin 78, ice formed within joint 72 that is located generally to the right of pivot pin 78 will be subject to shear forces and separate from either or both surfaces 74C and 76C. Ice located generally to the left of pivot pin 78 will be subject to compressive forces as surface 74C assumes a closely spaced positional relationship with surface 76C. Edge 84 of through passage 80 as well as an edge 90 formed on the end 92 of main yoke 74 will apply high localized loads to the ice, causing it to shear or fracture. Further clockwise rotation of secondary yoke 76 will cause the fractured ice to be expelled either leftwardly through the space between end 92 of main yoke 74 and surface 76C of secondary yoke 76 or upwardly through passage 80. This action reliably clears the foreign object to permit continued clockwise rotational freedom of secondary yoke 76.

Once secondary yoke 76 is subjected to counter-clockwise rotation relative to main yoke 74, a similar process occurs in which ice located generally to the left of pivot in 78 will be subject to shear forces as surfaces 74C and 76C separate. Simultaneously, ice generally located to the right of pivot pin 78 will be subjected to compressive loading as surfaces 74C and 76C approach one another. Edge 88 will apply high localize pressure to the ice, causing it to shear or shatter. Further counter-clockwise rotation of secondary yoke 76 will cause the shatter ice to be expelled either rightwardly between surfaces 74C and 76C or upwardly through passage 80. Edges 84 and 88 thus constitute means to shearingly fracture foreign objects such as ice disposed within the joint 72 operating as a guillotine. Although opening 80 is preferably a simple through passage as illustrated in FIG. 5, it is contemplated that other alternatives are conceivable without departing from the spirit of the present invention. For example, a closed cavity or recess 90 formed in main yoke 74 or secondary yoke 76 to receive the fracture ice, or a trap door structure which momentarily opens to expel the fractured ice, could be substituted. Through passage 80 is preferably generally rectangular in shape although it could be otherwise constructed for aesthetic considerations. The present invention can be applied to wiper systems employing any number of cascadingly interconnected yokes, bows or structural elements.

Referring to FIG. 6, an alternative embodiment of the present invention is illustrated. A windshield wiper structure 100 includes a joint 102 rotatably interconnecting the end of a main yoke 104 with a secondary yoke 106. Yokes 104 and 106 have generally parallel side walls 104A and 106A interconnected by webs 104B and 106B respectively, as described with respect to the windshield wiper structure 70 of FIG. 5. A pivot pin 108 extends through registering apertures formed in side walls 104A and 106A, permitting relative limited rotational freedom between main yoke 104 and secondary yoke 106. The lower most surface 104C of web 104B of main yoke 104 opposes the upper most surface 106C of web 106B of secondary 106. A through passage 110 is formed in web 106B, extending from surface 106C downwardly as illustrated in FIG. 6. Through passage 110 has a first end 112 disposed adjacent pivot pin 108 and a laterally opposed end 114. Ends 112 and 114 are beveled to form sharp edges 116 and 118, respectively, to shear and shatter ice or other foreign objects which become lodged within joint 102. Main yoke 104 and secondary yoke 106 interact to shear and eliminate ice or other foreign objects substantially as described with respect to FIG. 5 herein above.

Joint 102 includes guide means such as a spacer 120 disposed intermediate main yoke 104 and secondary yoke 106 to provide a smooth operating low friction bearing surface there between. Spacer 120 has integral side walls 120S which are dimensioned to provide a lateral slip fit between side walls 104A of main yoke 104 and side walls 106A of secondary yoke 106 to ensure precise positioning there between while allowing free relative rotation between main yoke 104 and secondary 106. Bushing (not shown) integrally formed with side walls 120S provide bearing surfaces between the ends of pivot pin 108 and side walls 104A of main yoke 104. Spacer 120 is constructed and function substantially as described with respect to spacer 20 illustrated in FIG. 2.

Side walls 120S of spacer 120 are interconnected by a web 120W which is nominally located intermediate surfaces 104C and 106C. This intermediate spacing permits limited rotational freedom of movement of spacer 120 with respect to both main yoke 104 and secondary 106. As illustrated in FIG. 6, spacer 120 is illustrated in solid line in its counter-clockwise most limit of travel wherein web 120W is contacting surface 106C and, alternatively, in its clockwise most limit of travel in phantom wherein web 102W is contacting surface 104C of main yoke 104. In one rotational limit of travel, web 120W is generally parallel to surface 104C and in the opposite limit of rotational travel, web 120W in generally parallel to surface 106C. This arrangement ensures an open passage way is available for expelling fracture ice during the joint clearing process described with respect to FIG. 5. Spacer 120 is preferably formed out of plastic material such as nylon or teflon and can be provided with sharp edges or other structural features which provide an ice shearing or clearing.

It is to be understood that the invention has been described with reference to specific embodiments and variations to provide the features and advantages previously described and that the embodiments are susceptible of modification as will be apparent to those skilled in the art. For example, although the main and secondary yokes described herein are preferably formed of stamped metal, it is contemplated that they could be constructed of injection molded thermal plastic or other substitute material. Furthermore, although the joints have been described as assemblies of two structural elements interconnected by a pin to define an axis of rotation, it is contemplated that the main and secondary yokes could be constructed from a single monolithic integrally formed structure employing resilient living hinges or other suitable pivot arrangements. Accordingly, the foregoing is not to be construed in a limiting sense.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed:

1. A windshield wiper structure comprising:
   an elongated primary yoke having a pivot mount location and a free end remote from the pivot mount location;
   an elongated secondary yoke mounted for rotation on the primary yoke about a pivot axis proximate the free end of the primary yoke, said yokes defining opposed surfaces which, upon said rotation, assume a closely spaced confronting positional relationship in response to said rotation; and
   an opening defined in one of said surfaces proximate the free end of the primary yoke between longitudinally spaced first and second lateral edges, each edge confronting the other surface as the surfaces assume their closely spaced confronting positional relationship in response to said rotation so that the edges coact with the other surface to shear and expel solid foreign objects located between said surfaces;
   said opening comprising a recess formed in said one surface.

2. The structure of claim 1 wherein said first edge is proximate the pivot axis and said second edge is spaced along said one surface from said pivot axis in the direction of said pivot mount location.

3. The structure of claim 1, wherein:
   each yoke has a generally U-shaped cross-sectional configuration including spaced parallel side walls interconnected by an upper web;
   the secondary yoke is nested within the primary yoke;
   the pivot axis is defined by a pivot pin extending through the yoke side walls beneath the webs; and
   said surfaces comprise confronting web surfaces.

4. The structure of claim 1 wherein said one surface is defined on said primary yoke.

5. A windshield wiper structure comprising:
   any elongated primary yoke having a pivot mount location and a free end remote from the pivot mount location;
   any elongated secondary yoke mounted for rotation on the primary yoke about a pivot axis proximate the free end of the primary yoke, said yokes defining opposed surfaces which assume a closely spaced confronting positional relationship in response to said rotation;
   an opening defined in the secondary yoke surface proximate the free end of the primary yoke between longitudinally spaced first and second lateral edges, the opposed surface on the primary yoke being solid proximate the opening in the surface of the secondary yoke, said first edge being proximate the pivot axis and said second edge being spaced along said wind surface from said pivot axis in the direction of said pivot mount location, each edge confronting the solid surface on the primary yoke as the surfaces assume their closely spaced confronting positional relationship in response to said rotation so that the edges coact with the solid primary yoke surface to sheer and expel solid foreign objects located between said surfaces.

6. The structure of claim 5, further comprising guide means disposed intermediate said primary and secondary yokes and operative to permit said relative rotation about said pivot axis while prohibiting relative lateral displacement between said yokes.

7. The structure of claim 6 wherein said guide means is disposed for at least limited rotation with respect to both said yokes.

8. A windshield wiper structure for interconnecting a wiping element with a driven wiper arm in a windshield wiper system of a motor vehicle, said structure comprising:
   an elongated primary yoke adapted at a pivot mount location thereon for connection to a wiper arm for displacement therewith and having a free end remote from said pivot mount location;

an elongated secondary yoke pivotally attached to said primary yoke, said primary and secondary yokes defining opposed surfaces which, upon relative rotation, assume a closely spaced confronting positional relationship; and an opening defined in the secondary yoke surface proximate the free end of the primary yoke between longitudinally spaced first and second lateral edges, the opposed surface on the primary yoke being solid proximate the opening in the surface of the secondary yoke, each edge confronting the solid primary yoke surface as the surfaces assume their closely spaced confronting positional relationship in response to said rotation so that the edges coact with the solid primary yoke surface to shear and expel solid foreign objects lodged between said surfaces.

9. The structure of claim 8, wherein said opening is longitudinally elongated, the first edge is disposed near the point of pivotal interconnection of said primary and secondary yoke means, and the second edge is spaced therefrom in the direction of the pivot mount location on the primary yoke.

10. The structure of claim 9, wherein said first and second edges are spaced by a dimension exceeding the nominal width of said primary yoke.

* * * * *